United States Patent

Einhorn

[11] 4,226,394
[45] Oct. 7, 1980

[54] ADJUSTABLE MOUNTING ARRANGEMENT FOR HOOKS AND THE LIKE

[75] Inventor: Ruediger Einhorn, Katonah, N.Y.

[73] Assignee: Coats & Clark, Inc., Stamford, Conn.

[21] Appl. No.: 952,262

[22] Filed: Oct. 18, 1978

[51] Int. Cl.² ............................................. A47F 5/00
[52] U.S. Cl. ................................ 248/225.1; 24/234; 248/225.2
[58] Field of Search .............. 248/225.3, 222.1, 215, 248/222.2, 222.3, 221.3, 221.4, 225.1, 224.4, 225.2, 223.4, 224.1, 224.2, 245, 220.2, 304; 24/230.5 R, 234, 241 PL

[56] References Cited

U.S. PATENT DOCUMENTS

| | | | |
|---|---|---|---|
| 567,676 | 9/1896 | Bohy et al. | 403/252 |
| 925,406 | 6/1909 | Wennstrom | 24/234 UX |
| 1,958,497 | 5/1934 | Rivers | 248/222.2 |
| 2,246,630 | 6/1941 | Johnson | 24/234 X |
| 2,978,766 | 4/1961 | Arnett | 24/234 X |
| 2,987,289 | 6/1961 | Wamsley | 248/304 X |
| 3,166,285 | 1/1965 | Downes | 248/245 |
| 3,443,783 | 5/1969 | Fisher | 248/222.3 |
| 3,513,606 | 5/1970 | Jones | 248/245 X |
| 3,880,390 | 4/1975 | Niven | 248/222.3 X |
| 3,986,780 | 10/1976 | Nivet | 403/252 X |
| 4,065,904 | 1/1978 | Taylor | 248/245 X |
| 4,068,878 | 1/1978 | Wilner | 403/252 X |
| 4,101,231 | 7/1978 | Streib | 403/252 |

FOREIGN PATENT DOCUMENTS 1322664 7/1973 United Kingdom ..................... 248/304

*Primary Examiner*—J. Franklin Foss
*Attorney, Agent, or Firm*—Burgess, Ryan and Wayne

[57] ABSTRACT

An arrangement for enabling hooks to be secured to a slotted bar, for holding and displaying kitchen tools and accessories or other items. The slotted bar is hollow, and is selectively engaged by a hook-supporting member having a sector-shaped shank portion with a flat near the longitudinal axis of the member, with an end portion forming at least two shoulders for engaging opposite edges of the slot. The end portion is inserted at a transverse angle with respect to the slot, so that the shoulders engage the edges of the slot and the adjacent internal surfaces of the hollow bar. A cap is threaded onto the body portion to urge the shoulders into firm contact with the bar, thus retaining in position the hook or other device attached to the body portion of the member.

18 Claims, 15 Drawing Figures

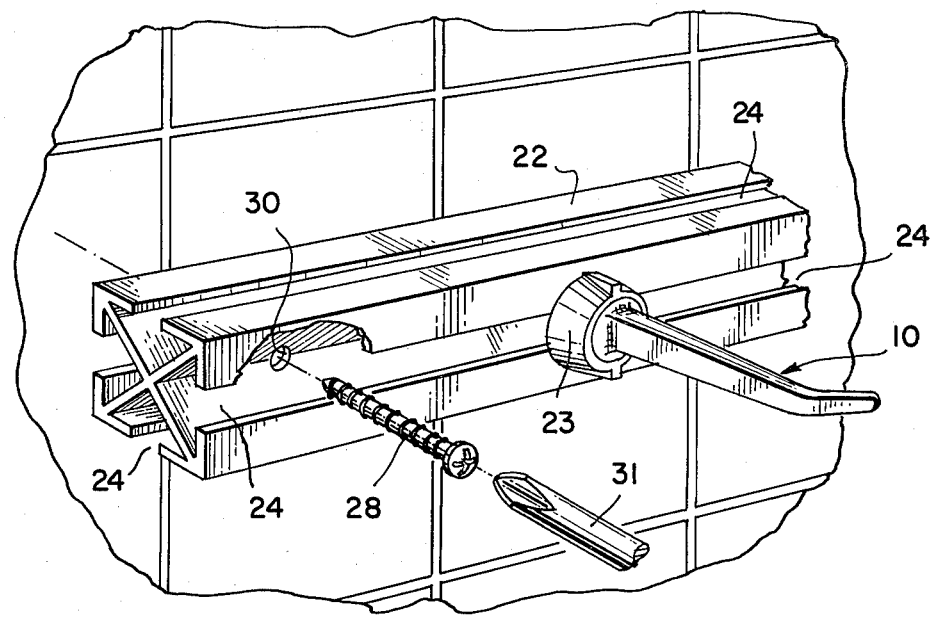
FIG.6
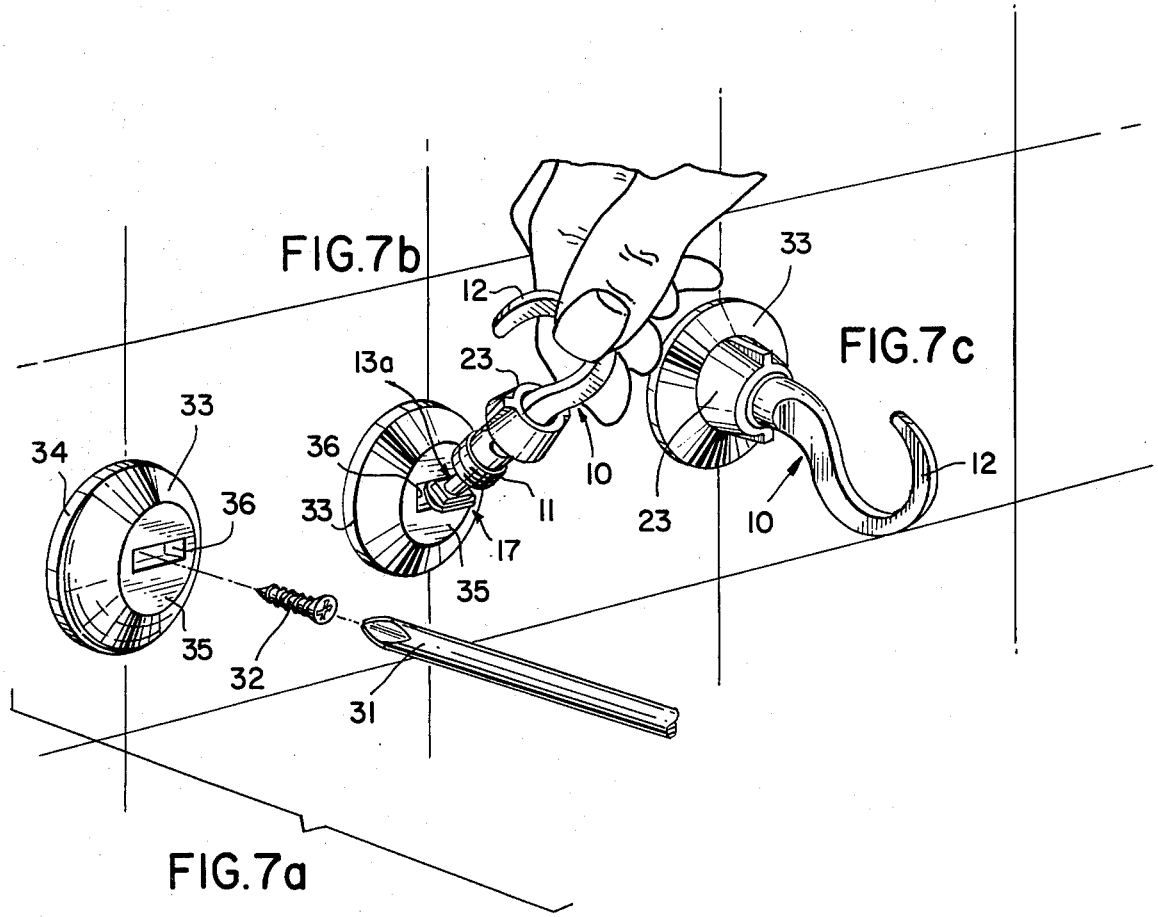
FIG.7b  FIG.7c
FIG.7a

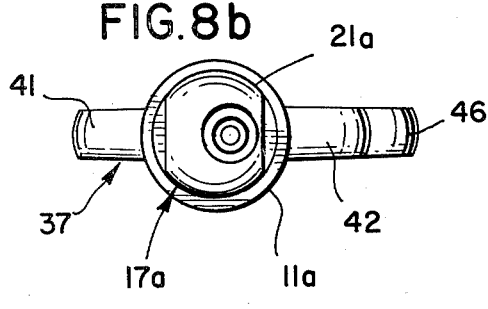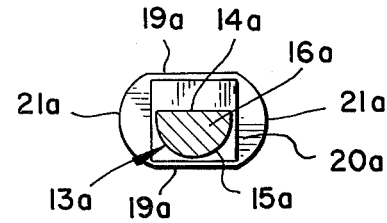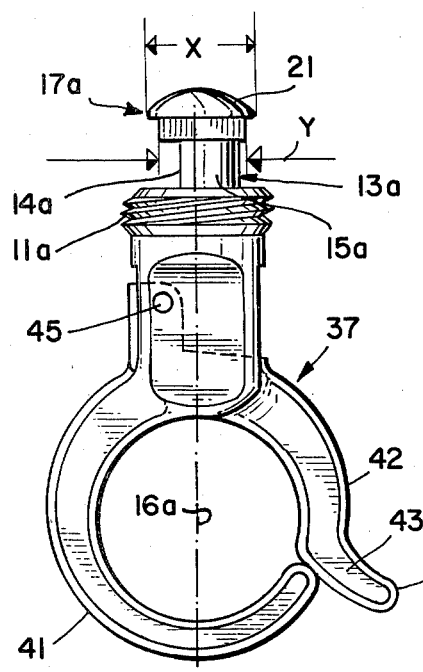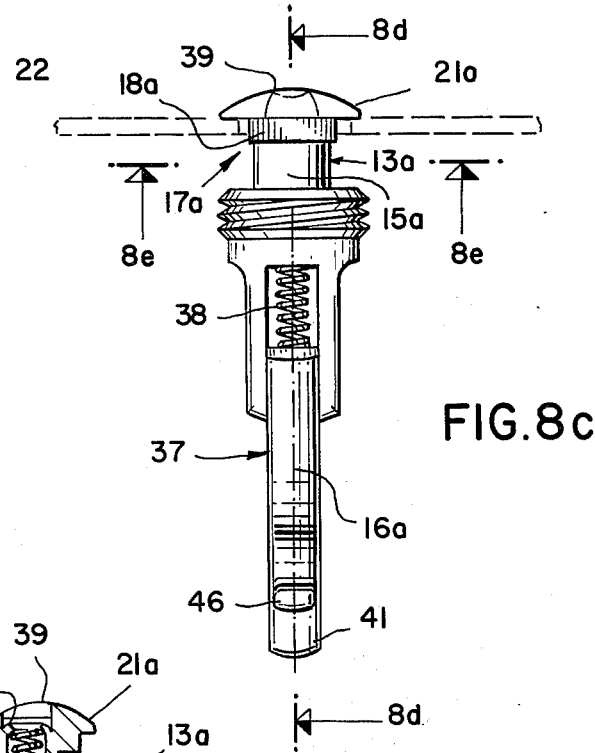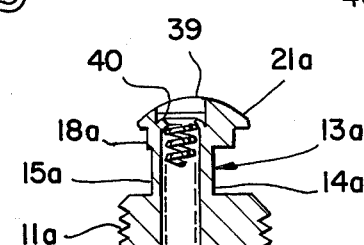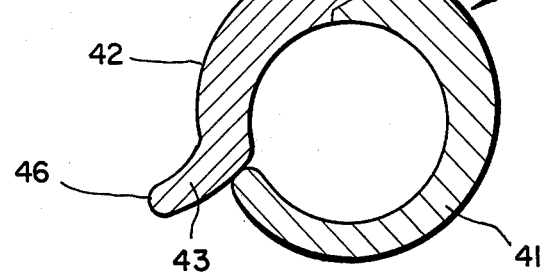

ADJUSTABLE MOUNTING ARRANGEMENT FOR HOOKS AND THE LIKE

This invention relates to an adjustable mounting apparatus including a member selectively engageable with a slot in a hollow element, and to a hook suitable for use in connection with said apparatus.

Many systems for enabling items to be stored or displayed to be supported by hooks or the like are known in the art. One class of systems is that known as "track" systems, in which hooks or the like are supported on an elongated bar or other member. Such systems, however, are either of relatively complex construction or require the use of tools for attaching, moving and detaching hooks or the like from the bar.

Accordingly, an object of the present invention is to provide an improved track system for accommodating members detachably securable thereto and capable of providing hooks or the like for storing, organizing and/or displaying kitchen tools or other items.

As herein described there is provided adjustable mounting apparatus selectively engageable with a hollow element including in an external surface thereof a slot having a predetermined width, said apparatus comprising a member selectively engageable with said slot, said member comprising a body portion; a shank portion adjacent said body portion and having first and second peripheral surface parts parallel to an axis extending through said body portion, with said first part relatively close to said axis and the major portion of said second part relatively remote from said axis; and a head portion adjacent said shank portion, said head portion comprising (i) a mounting part having two parallel edges symmetrically disposed about said axis for engaging said slot, and (ii) an end part cooperating with said mounting part to form two shoulders adjacent said edges for retaining said member in said slot; and means for urging said shoulders against the edges of said slot to retain said member in engagement with said slotted element.

Also herein described is a hook comprising a body portion, an open fixed hook portion extending from said body portion and having a free end, a lever having one end pivotally mounted on said body portion, and a spring disposed within said body portion for urging the other end of said lever against the free end of said hook portion.

IN THE DRAWING

FIG. 6 illustrates the manner in which the bar shown in FIGS. 3 and 4 may be secured to a mounting surface;

FIGS. 7a, 7b and 7c illustrate the manner of detachably securing the member of FIG. 1 to a slotted adapter plate;

FIG. 8a shows another member according to the invention, which member includes a ring-holding hook, FIG. 8a being a front elevation view thereof;

FIG. 8b is a top plan view of the member shown in FIG. 8a;

Figure 3:
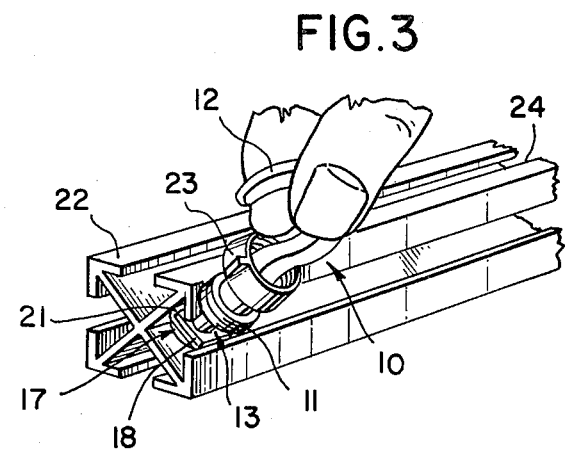
FIGS. 3 and 4 illustrate the securing of the member of FIG. 1 to a slotted bar having an X-shaped cross-section and four longitudinal slots on its lateral surfaces.
Figure 9:
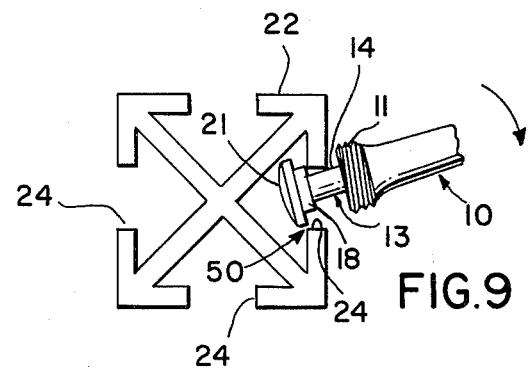

FIG. 8c if a left side elevation view of the member shown in FIG. 8a;

FIG. 8d is a rear cross-sectional view of the member shown in FIG. 8a taken along the cutting plane 8d—8d shown in FIG. 8c;

FIG. 8e is a plan cross-sectional view taken along the cutting plane 8e—8e shown in FIG. 8c; and FIG. 9 is a partial side view of the interacting portions of the member and bar in the position shown in FIG. 3.

Figure 1:
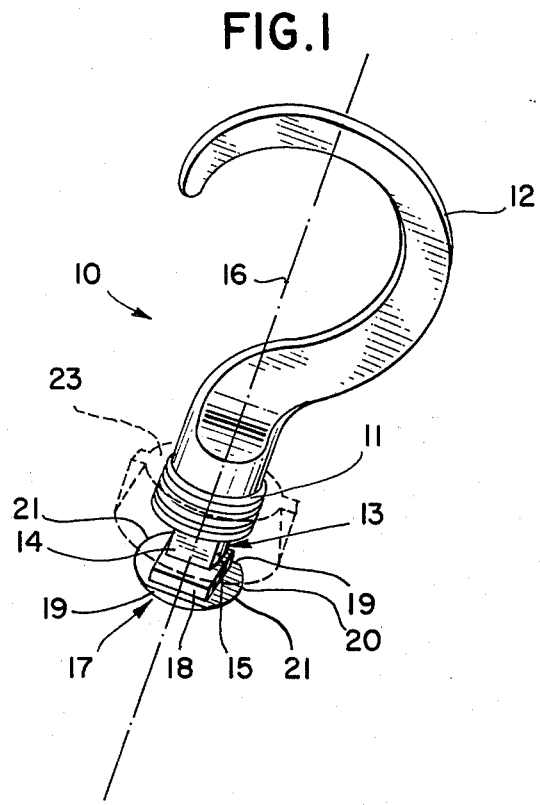
FIG. 1 is a perspective view of a member having a hook affixed thereto in accordance with a preferred embodiment of the present invention.

As shown in FIG. 1, the member 10 comprises an externally threaded body portion 11 with which a hook 12 is integrally associated, a sector-shaped shank portion 13 adjacent the threaded portion 11 and having a flat surface 14 and a cylindrical surface 15. A longitudinal axis 16 extends through the center of curvature of the threads of the generally cylindrical body 11 and the center of curvature of the cylindrical surface 15 of the shank portion 13 of the member 10. The surfaces 14 and 15 of the shank portion 13 are parallel to the axis 16, with the flat portion 14 being relatively close to said axis and the major part of the cylindrical surface 15 being relatively remote from said axis.

Adjacent the shank portion 13 of the member 10 is a lead portion 17 comprising (i) a mounting part 18 having a square or other regular polygonal cross-section (a square cross-section is shown in FIG. 1), with edges 19 disposed in parallel pairs symmetrically with respect to the axis 16; and (ii) a rounded end part 21 having a greater transverse dimension than the mounting part 17, and forming shoulders therewith adjacent the edges 19. The major surface 20 of the mounting part 17 is perpendicular to the axis 16.

The shoulders formed between the rounded end part 21 and the adjacent edges 19 of the mounting part 18 of the lead portion 17 of the member 10 serve to engage opposite sides of a slotted bar 22 (See FIG. 2) to retain (in cooperation with the cap 23 shown in dashed lines in FIG. 1) the member 10 in position detachably secured to the bar 22. While a square configuration of the mounting part 18 will allow for two pairs of alignment shoulders at right angles to each other, and therefore allow for four possible orientations of the member 10 with respect to the bar 22, additional angular orientations can be provided by a regular polygonal shape of the mounting part 18 having additional pairs of mounting shoulders. For example, hexagonal or octagonal shapes of the mounting part 18 would permit for 6 and 8 possible angular orientations of the member 10 with respect to the bar 22 respectively.

The torsion-resisting strength of the connection between the member 10 and bar 22, however, decreases as the number of shoulder pairs of the mounting part 18 increases, so that in many practical applications the torsion-resisting strength of the connection is inadequate if the mounting part 18 has more than b 8 shoulder surfaces, i.e. greater magnitude than that of an octagon.

To mount the member 10 to the bar 22 via the longitudinal slot 24 therein, the cap 23 is first disposed adjacent the threaded portion of the member 10, i.e. the body part 11. The cap 23 is internally threaded, and may be threadably engaged with the body portion 11 at this time, or may be disposed on the side of said body portion remote from the lead portion 17.

The member 10 is then oriented with the lead portion 17 thereof adjacent the slot 24 of the bar 22, and the flat surface 14 of the shank portion 13 of the member 10 as close as possible to an edge of the slot 24. The member 10 is then manipulated so that the lead portion 17 is disposed in the slot 24, with the edge of said lead portion adjacent the flat surface 13 entering the slot first.

The member 10 is then "straightened" so that the axis 16 thereof is perpendicular to the surface of the bar 22 which contains the slot 24, and positioned so that the shoulders formed by two parallel edges 19 of the mounting part 18 of the member 10 and the adjacent surface 20 of the end part 21, are engaged with corresponding edges of the slot 24, to prevent rotational movement of the member 10 with respect to the bar 22. This angular position of the member 10 is maintained, and sliding of the member 10 along the slot 24 is prevented, by tightening the cap 23 to urge the surface 20 of the end part 21 of the member 10 against the interior bar surface adjacent the slot 24.

As shown in FIG. 9, the dimensions of the end part 21, thickness of the bar 22, height of the mounting part 18, and position of the flat 14 of the shank 13 on the member 10, should be interrelated so that when the member 10 is in the intermediate installation position shown in FIG. 9, the remote edge 50 of the end part 21 does not interfere with the adjacent edge of the slot 24 of the bar 22.

The bar 22 is preferably hollow, with the configuration of a square prism, and four slots 24, one slot on each lateral surface of the bar 22.

Figure 4:
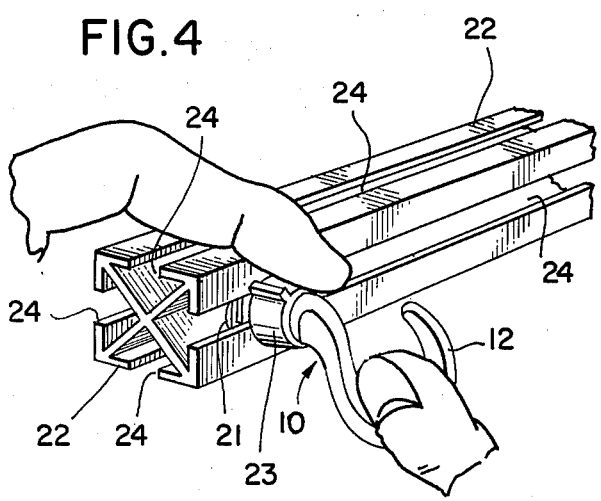
Figure 5:
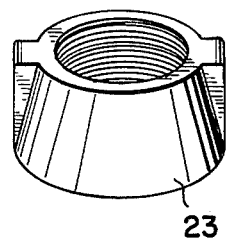
FIG. 5 is an isometric view of the cap employed in securing the member of FIG. 1 to a slotted bar.

To provide such a configuration of the bar 22, it is preferably provided with an internal X-shaped cross-section, as shown in FIGS. 3 and 4, with an X-shaped rib extending the length of the bar to provide the required internal support.

Figure 2:
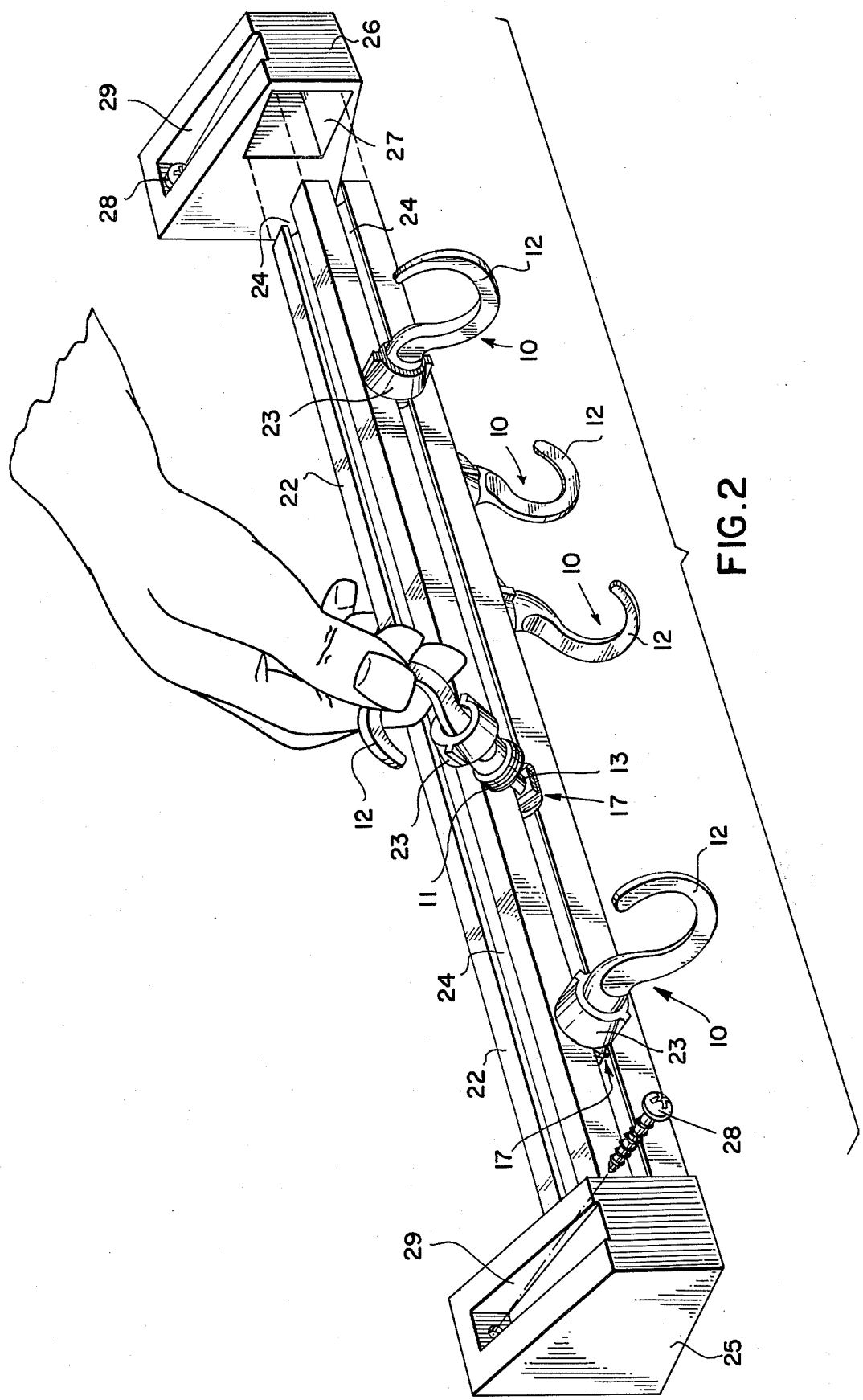
FIG. 2 illustrates the manner in which the member of FIG. 1 is selectively secured to a longitudinally slotted bar.

In the arrangement shown in FIGS. 2, 3 and 4, the bar 22 is retained in a desired position by means of end caps 25 and 26, each of said caps having a square recess 27 therein for receiving an end of the bar 22. The end caps 25 and 26 are secured to a wall, cabinet lower surface, or other suitable mounting surface by means of screws 28 which extend through open channels 29 therein.

Alternatively, as shown in FIG. 6, the bar 22 can be provided with holes 30 through the axis of the X-shaped rib thereof, with screws 28 extending through said holes 30 to secure the bar 22 to the mounting surface. A screwdriver 31 may gain access for driving the screws 28 by extending through one of the slots 24.

Once the member 10 has been mounted to the bar 22, it can be rotated to another desired position or slid along the bar 24 to another position thereon, merely by loosening the cap 23, rotating or moving the member 10, and retightening the cap 23.

Thus no tools are required for installing, rotating, sliding, or removing the member 10 with respect to the bar 22.

Where it is desired to be able to interchange a variety of hooks or other elements which are to be mounted singly, the arrangement shown in FIGS. 7a, 7b and 7c may be employed.

As shown in FIG. 7a, an adaptor plate 33 having a circular mounting surface 34 and a parallel circular mounting surface 35 with a slot 36 therein, is secured to a wall or other support by means of a screw 32 which is driven by the screwdriver 31 through the slot 36.

As shown in FIG. 7b, the member 10 is thereafter detachably secured to the adaptor plate 33 by insertion of the lead portion 17 thereof into the slot 36, in precisely the same manner as previously described with respect to installation of the member 10 through the slot 24 of the bar 22. Thereafter the cap 23 is tightened to secure the member 10 to the adaptor plate 33. As before, the installation and removal of the member 10 with respect to the adaptor plate 33 is accomplished without the use of tools.

FIGS. 8a through 8e show a ring holder element, which contains the same installation and mounting functional portions as the member 10, said portions being identified by the same numerals as those employed in FIG. 1 followed by "a". As seen most clearly in FIG. 8a, and as is also true for the member 10, the width x of the end portion 21 of the member 37 is slightly greater than the width of the slot into which the member is to be installed; and the width y of the mounting portion 18 is slightly less than said slot width.

The ring holder 37 has a hollow channel extending along its longitudinal axis 16a, with a spring 38 disposed in said channel. The end 39 of the bore into which the spring 38 is inserted is thereafter staked at 40 to retain the spring in position.

The ring holder 37 comprises a fixed hook 41 and a lever 42 having one end 43 adjacent the free end of the hook 41, and another end 44 pivotally secured to the body portion of the holder 37 by a pivot pin 45. The spring 38 urges the lever 42 to rotate about the pivot pin 45, so that the free end 43 of the lever 42 abuts the free end of the fixed hook 41.

With this simple arrangement, a ring holder is provided for reliably holding ring-shaped objects or rings attached to such objects, with simple attachment and removal of such rings merely by temporarily manually deflecting the lever 42 by means of its extension 46.

Preferably the members 10 and 37 are made by die casting techniques utilizing a suitable die casting metal such as zinc or a zinc alloy. The cap 23 preferably comprises a plastic such as ABS.

The configuration of the shank portion 13 of the member 10 (and the portion 13a of the member 37) permits easy installation and removal of the member while providing a substantial shank strength. This configuration is preferable to parallel flat surfaces, since the resulting cross-section would have less strength than that of the shank 13.

Regardless of the shape of the shank 13, however, its largest transverse dimension (i.e. transverse to the axis 16) should be no greater than the width of the slot in which it is to be inserted, in order to provide easy installation and removal of the member 10.

While it is preferred that the height of the edges 19 of the mounting portion 18 of the member 10 be substantially equal to the thickness of the bar 22 (or adapter plate surface 35) adjacent the mounting slot, this is not an essential requirement.

What is claimed is:

1. A cap member selectively engageable with a hollow slotted element, comprising:
   an external threaded portion having a generally cylindrical cross-section with the threads thereof having a given axis of symmetry through the center of curvature thereof;
   a sector-shaped shank portion adjacent said threaded portion and having flat and curved surface parts parallel to said axis, with said flat part relatively close to said axis and the major portion of said curved part relatively remote from said axis; and a lead portion adjacent said shank portion, said lead portion comprising (i) a mounting part having a regular polygonal cross-section perpendicular to and symmetrically disposed about said axis for engaging said slot, and (ii) a rounded end part, said end part cooperating with said mounting part to form a plurality of shoulders for retaining said member in said slot; and an internally threaded cap for threadably engaging said threaded portion of said member.

2. The cap and member according to claim 1, wherein said axis extends through the center of curvature of the curved part of said shank.

3. The cap and member according to claim 1, further comprising a hook extending from said threaded portion of said member.

4. The cap and member according to claim 3, wherein said hook comprises a body portion adjacent said threaded portion, an open fixed hook extending from said body portion and having a free end, a lever having one end pivotably mounted on said body portion, and a spring disposed within said member parallel to said axis for urging the other end of said lever against the free end of said fixed hook.

5. An adjustable mounting arrangement, comprising, in combination:

a hollow slotted element having a given thickness adjacent the slot therein, said slot having a predetermined width;

a member selectively engageable with said slot, said member comprising:

an externally threaded portion having a generally cylindrical cross-section with the threads thereof having a given axis of symmetry through the center of curvature thereof;

a sector shaped shank portion adjacent said threaded portion and having flat and generally arcuate surface parts parallel to said axis, with said flat part relatively close to said axis and the major portion of said generally arcuate part relatively remote from said axis; and a head portion adjacent said shank portion, said head portion comprising a mounting part having a regular polygonal cross-section perpendicular to and symmetrically disposed about said axis for engaging said slot, and an end part, said end part cooperating with said mounting part to form a plurality of shoulders for retaining said member in said slot; and an internally threaded cap for threadably engaging said threaded portion of said member to urge said shoulders against the edges of said slot to retain said member in position.

6. The combination according to claim 5, wherein the thickness of said mounting part of said member is substantially equal to the thickness of said slotted element adjacent said slot.

7. The combination according to claim 5, wherein the width of said mounting part is less than the width of said slot, and the maximum transverse dimension of said end part is greater than the width of said slot.

8. The combination according to claim 5, 6 or 7, wherein said slot is elongated.

9. The combination according to claim 5, 6 or 7, wherein said slotted element comprises a bar having an X-shaped cross-section, with peripheral flanges defining a rectangular prism, with one elongated slot in each lateral surface thereof.

10. The combination according to claim 5, wherein said slotted element has one major surface including means for securing said one major surface to a mounting surface, and a parallel major surface containing said slot therein, said slot providing access to said securing means.

11. The combination according to claim 10, wherein said major surfaces are circular.

12. The cap and member according to claim 1, wherein said member comprises a die-casting metal.

13. The combination according to claim 5, wherein said mounting part of said member has a square cross-section.

14. Adjustable mounting apparatus selectively engageable with a hollow element including in an external surface thereof a slot having a predetermined width, said apparatus comprising:

a member selectively engageable with said slot, said member comprising:

a body portion;

a shank portion adjacent said body portion and having first and second peripheral surface parts parallel to an axis extending through said body portion, with said first part relatively close to said axis and the major portion of said second part relatively remote from said axis; and a head portion adjacent said shank portion, said head portion comprising (i) a mounting part having two parallel edges symmetrically disposed about said axis for engaging said slot, and (ii) an end part cooperating with said mounting part to form two shoulders adjacent said edges for retaining said member in said slot; and means for urging said shoulders against the edges of said slot to retain said member in engagement with said slotted element.

15. The combination according to claim 5, wherein said end part is rounded.

16. The combination according to claim 15, wherein said end part has a maximum dimension transverse to said axis which is less than the root diameter of said threaded portion of said member, and said member has an enlarged end remote from said rounded end part which prevents said cap from traversing said enlarged end.

17. The combination according to claim 5, wherein said thickness of said hollow slotted element and dimensions of the end part, height of said mounting part measured in the direction of said axis, position of said flat of said shank portion, are interrelated to preclude interference of any portion of said end part with adjacent edges of said slot when said member is in an intermediate installation position in the course of engagement with said slot.

18. An article holding hook comprising:

an elongated body portion having a longitudinally oriented hole therein;

a coil spring disposed in said hole;

means adjacent one end of said body portion for retaining one end of said spring;

an open fixed hook portion extending from the other end of said body portion and having a free end; and a lever having one end pivotally mounted on said body portion adjacent said other end of said body portion, said lever having a portion in alignment with said hole adjacent said one end of said lever, said lever portion abutting the other end of said coil spring, the other end of said lever engaging the free end of said hook portion and being urged against said free end by said spring, said other end of said lever including a tab section extending away from said hook member for enabling said article holding hook to be opened.

* * * * *

UNITED STATES PATENT AND TRADEMARK OFFICE
CERTIFICATE OF CORRECTION

PATENT NO. : 4,226,394

DATED : Oct. 7, 1980

INVENTOR(S) : Ruediger Einhorn

It is certified that error appears in the above—identified patent and that said Letters Patent is hereby corrected as shown below:

Column 2, line 62: Before "8" delete "b".

Signed and Sealed this

Twelfth Day of May 1981

[SEAL]

Attest:

RENE D. TEGTMEYER

Attesting Officer     Acting Commissioner of Patents and Trademark